United States Patent

Meyer et al.

[11] 3,970,070
[45] July 20, 1976

[54] SOLAR HEATING SYSTEM

[76] Inventors: Stanley A. Meyer, 2931 Bryden Road; Stephen R. Gray, 2772 Allegheny Ave., both of Columbus, Ohio 43209

[22] Filed: Sept. 3, 1975

[21] Appl. No.: 610,051

[52] U.S. Cl. .................................. 126/271; 350/96 B
[51] Int. Cl.² ............................................. F24J 3/02
[58] Field of Search ............ 237/1 A; 126/270, 271; 350/96 B

[56] References Cited
UNITED STATES PATENTS

| | | | |
|---|---|---|---|
| 1,951,403 | 3/1934 | Goddard | 126/271 |
| 1,969,839 | 8/1934 | Goddard | 126/271 |
| 2,213,894 | 9/1940 | Barry | 126/271 |
| 3,064,418 | 11/1962 | Sanders | 126/270 X |
| 3,252,456 | 5/1966 | Bohn, Jr. | 126/271 |
| 3,780,722 | 12/1973 | Swet | 126/270 |

*Primary Examiner*—Kenneth W. Sprague
*Attorney, Agent, or Firm*—Cennamo Kremblas & Foster

[57] ABSTRACT

A solar heating system comprising a lens collector arrangement, an insulation area, and a storage section positioned in an enclosing structure, and an associated utilization means. The collector lens is an array of light guide lenses having alternate high and low refractive surfaces. The array is contoured in a capping relationship over a focusing lens to provide an extremely high concentration of solar energy irrespective of the angle of the sun. The light guide lenses increase by several orders of magnitude the amount of solar energy striking the surface of the focusing lens. The focusing lens is a plurality of flat surface type of lenses stacked one over the other in spaced relationship and operable to concentrate the solar energy to a central region. Surrounding the perimeter of the plurality of focusing lenses in an array, in a "wall" configuration, of light guide lenses similar in construction to the aforesaid capping light guide lenses. The angle of the reflective surfaces of the capping lenses and the wall lenses is such to receive and direct to the focusing lenses the maximum amount of radiation at all times of the day and season. The insulation area is positioned between the collector lens and the storage section to provide a convective barrier for the storage area without inhibiting the passage of solar radiation. The storage section is of a high absorption material with an auxiliary conventional heat source.

10 Claims, 8 Drawing Figures

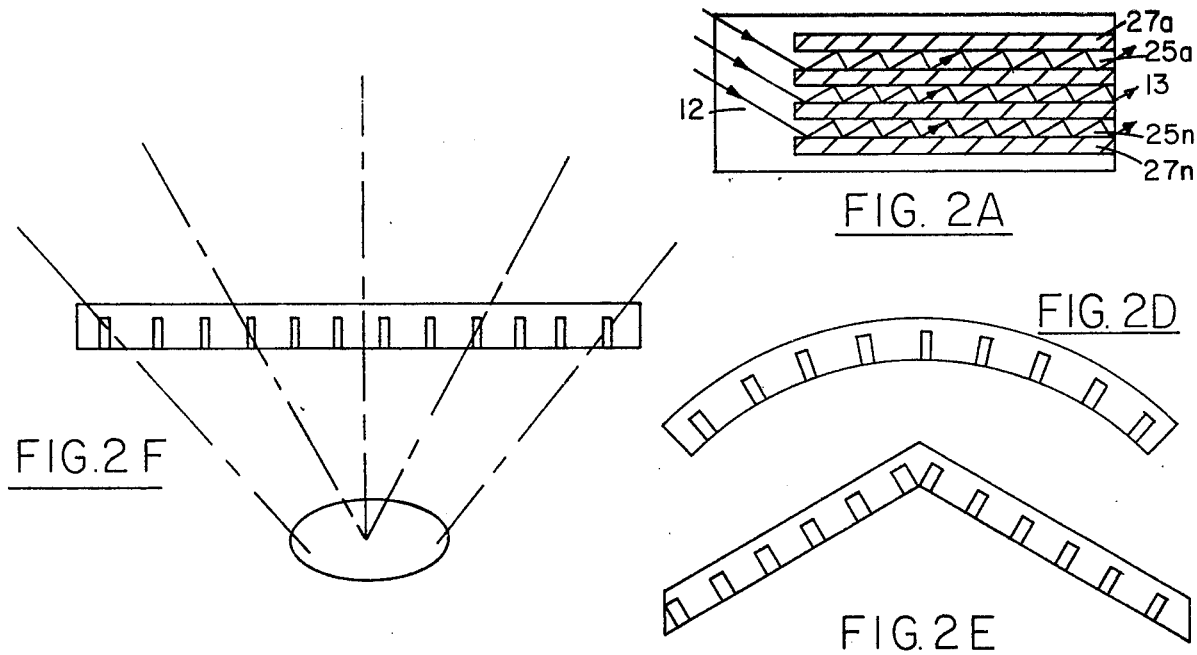
FIG. 2A
FIG. 2D
FIG. 2F
FIG. 2E
FIG. 2B
FIG. 2C
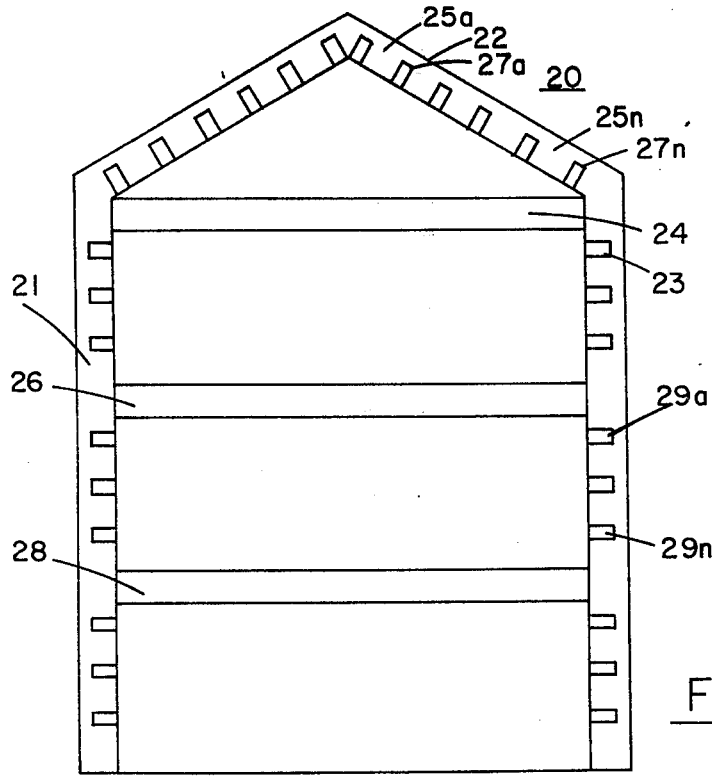
FIG. 2

SOLAR HEATING SYSTEM

CROSS REFERENCE

The "Light Guide Lens" of the co-pending application filed Sept. 3, 1975, by the same inventors herein and given Ser. No. 609,928, is that utilized in the present invention.

BACKGROUND

With the energy crisis created by the impact of the natural resources shortage, together with the anticipated depletion of the natural resources, a considerable amount of effort has been directed to other forms of energy. Although there are several other forms of energy, the emphasis has been placed on solar energy as the most logical heat source. Consequently there are on the market many so-called solar furnaces.

These prior art devices generally comprise a focusing lens, a medium - either air or liquid - to be heated, in some instances a storage tank, and in other instances a reflective surface such as a mirror and/or a reflector.

Although these solar furnaces are operable and in certain instances commercially operable, they are not without their attendant disadvantages. Principally the problem area is a lack of a sufficient concentration system for the incident solar energy, directivity relative to the angle of the sun, and a storage system with a capacity to carry the system on cloudy days. The problem related to the concentration of the solar energy is with the lens and its reflecting surfaces and the response of the system to the low angles of the sun.

Further, the prior art systems generally utilize the solar radiation to heat either a liquid or air directly and then utilize the heated air or water for the intended purpose. Storage systems are much fewer and are of the indirect type, that is, the heated excess air or liquid is placed in a storage medium. These prior art storage systems are very simple in structure and somewhat crude. Very little advance in the art has been made with storage systems.

Although perhaps in some future period of time solar energy may be a complete substitute for other forms of energy, today solar energy, at best, is a supplement to or an alternate source of energy. Nonetheless, the failure of the prior art to recognize the practical usefullness of solar energy has resulted in commercial systems that are extremely expensive, but, yet, of only a minimal and questionable value.

SUMMARY OF INVENTION

The invention comprises in its most general aspects a unitary air/liquid tight cylindrical enclosure that houses a combination of components that are responsive sequentially to solar radiation. The system provides a heat source with a larger capacity and operable for an extended period of time over that of the prior art. Within the cylindrical enclosure the components comprise in the order of operability a collector lens, an insulating area, and a storage section. Utilization means for effectively utilizing the heat generated is associated with the basic combination of apparatus.

The collector lens, the insulation area, and the storage section are serially joined together and housed in an air/liquid tight cylindrical (with appropriate vents) enclosure that is insulated against heat loss.

The collector lens configuration includes an upper or top contoured capping light guide lens array positioned over a first flat surface focusing lens. Beneath the focusing lens there is positioned in spaced relationship several additional focusing lenses. Surrounding the perimeter of the plurality of focusing lenses is an array, in wall-like arrangement, of light guide lenses similar in embodiment to the capping light guide lenses. All of the lenses are joined in a unitary structure. Each of the light guide lenses is made up of a series of alternate high and low refractive areas periodically spaced one from the other. In this way the sun from all angles strikes the reflective surfaces of the upper contoured lens and at least one side of the wall lens thereby directing to the flat surface of the focusing lenses a high incidence of solar radiation.

The focused solar radiation passes through an insulation area, uninhibited, to the storage section. The storage area, that may take alternate forms, comprises a liquid and/or material that has a high rate of absorption to the solar radiation and thereby converting the same to heat. The insulation area comprises in the preferred embodiment a liquid and salt solution. In operation upon receipt of the heat from the adjacent storage area the heat converts the liquid solution into horizontal stratifications, a homogeneous layer that in the presence of a temperature gradient above and below, becomes an internal nearly isothermal convective layer.

The utilization means is conventional in nature and may take several known forms.

In contradistinction to the prior art, the solar radiant energy heat source of the present invention is a primary heat source. That is, if there should occur successive days of low solar energy (cloudy) and the heat stored in the storage section drops below a predetermined level, the storage section will be activated by an auxiliary and standard heat source.

The storage area is in fact the heat source for the utilization means, and, which heat source receives its primary and most of its activation from solar energy and its supplemental energy if and when needed by a standard source.

OBJECTS

It is accordingly a principal object of the present invention to provide a new and improved solar energy heating system that increases by several orders of magnitude the amount of incident solar radiation A further object of the invention is to provide a solar energy concentrator that substantially increases the amount of incident solar radiation at all angles of the sun.

Another object of the invention is to utilize a collector lens comprising a contoured upper lens and a plurality of focusing lenses completely surrounded by light guide lenses.

Another object of the invention is providing an insulation area between the focusing lens and a storage area that is a convective (heat loss) barrier to the storage area but impervious to the solar radiant energy.

Another object of the invention is to provide a storage section that is effecrively the heat utilization source and which source can be implemented by other sources of energy during extended periods of low solar radiant energy.

Still another object of the present invention is to provide a system that is highly efficient but yet not unrealistically large or bulky and that is relatively simple in construction and low in cost.

Other objects and features of the present invention will become apparent from the following detailed description when taken in conjunction with the drawings in which:

BRIEF DESCRIPTION OF DRAWINGS

FIG. 2 illustrates a preferred lens arrangement shown generally as collector lens 20 of FIG. 1.

FIG. 2A through 2F are various alternate embodiments of the light guide lens utilized in the present invention.

DETAILED DESCRIPTION OF DRAWINGS

Figure 1:
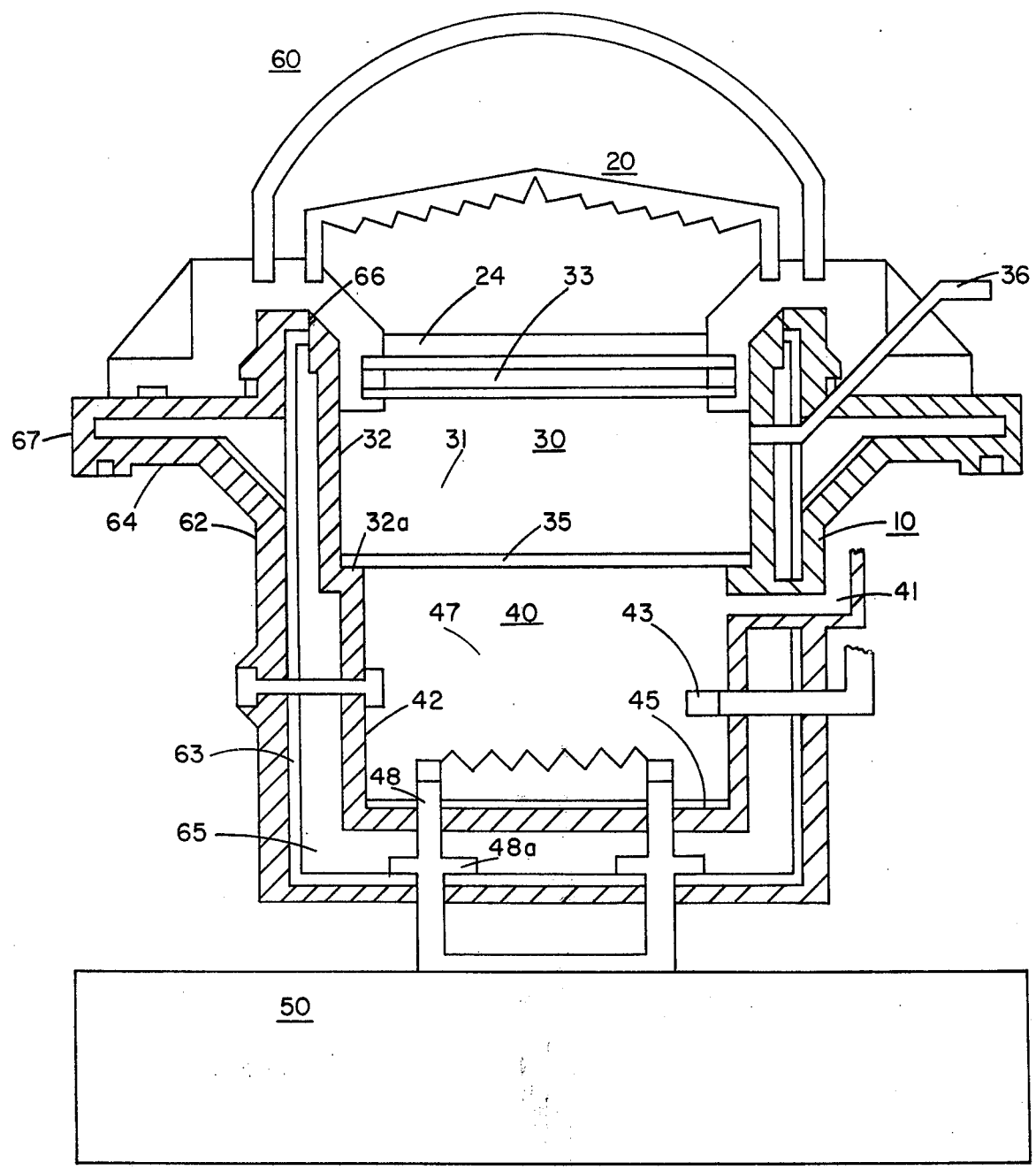
FIG. 1 is an overall cross sectional schematic view of the preferred embodiment of the present invention.

With particular reference now to FIG. 1, there is illustrated schematically a preferred embodiment of the present invention. In its most fundamental form the solar heater comprises a housing or enclosure 10, solar energy concentrator 20, an insulation area 30, a heat storage section 40, and a utilization means 50.

In principle of operation, the concentration lens arrangement 20 is capable of directing a maximum amount of solar radiation to a focusing lens. The solar radiation is directed to the focusing lens from all angles irrespective of the position of the sun overhead or on the horizon.

The focused solar radiation passes through a heat insulation barrier 30 to a thermal storage section 40. The insulation barrier 30 is such that it does not inhibit the solar radiation but does - as hereinafter described - inhibit the passing of thermal radiation (convective barrier). Once solar radiation is converted to thermal radiation the "heat" is retained in the storage section until otherwise depleted by the utilization means 50.

In actual operation the storage area 50 is the heat source. With a given capacity and the extremely efficient solar radiation concentrator lens 20, the storage section 40 does generate and retain an extremely large amount of thermal energy hereintofore not possible with the prior art solar furnaces.

As very generally indicated above, the solar heat system of the present invention is the primary source of energy; however, and practically, it is not intended as the sole energy source. That is, rather than the solar heat source being supplemental to a conventional heat source, the present invention provides for an auxiliary source of heat energy to the solar heat source - when and if needed. More particularly, when the thermal gradient of the storage section 40 drops below a predetermined level, an auxiliary source 42 is activated. The solar radiation source of the present invention is sufficient, due to the efficiency of the solar radiation concentrator lens 20 and the insulator 30, to meet the daily demands of a predetermined capacity. At night time the thermal gradient of the storage area 40 will be reduced by consumption - but not by heat loss of the system. By supplementing the heat capacity of the storage section 40 at night time (if needed) the conventional energy source would be called upon at low peak load times - and, when the rates are lowest. With a sufficient storage capacity of storage section 40 and with no loss a prolonged number of days without sunshine can be tolerated.

In the event the storage section 40 should exceed a certain predetermined thermal gradient such as can occur for extended periods of "sunny" days a heat sink 41 to the storage section 40 is provided to dissipate the excess energy. Additionally, a shutter arrangement, temperature controlled in a conventional manner, would be provided with collector lens 20.

The solar radiant energy lens 20 of FIG. 1 is shown more explicitly (again schematically) in FIGS. 2, 2A, 2B, 2C, 2D, 2E, 2F, and 2G to which particular reference now may be had. As aforesaid the light guide lens per se, utilized in the preferred embodiment, is that shown, described, and claimed in our co-pending application, Ser. No. 609,928, for "Light Guide Lens" and filed Sept. 3, 1975.

Basically each light guide lens in the array comprises alternate areas of high refractive (transparent) material $25a$ xxx $25n$ and low refractive (reflective) material $27a$ xxx n as shown in cross section in FIG. 2 and in a planar view in FIG. 2A. The dimensions of the low refractive material are highly exaggerated and in actuality are extremely thin, striplike with a very high polished surface. A thicker surface would, of course, be a light block. In principle the light 12 (solar radiation) incident on the array travels in a straight path through the transparent (high refractive) material until it strikes a reflective surface of the walls of the low refractive material $27a$ xxx n. The light is then reflected back and forth by the reflective surfaces of the light guide and transmitted therefrom. The angle of the beam emitted (transmitted light) is, of course, dependent upon the wave length of the light, and the width and length of the light guide.

In the preferred embodiment shown in FIG. 2 the collector lens 20, in itself a unitary structure, comprises an array of light guides in an upper or top capping lens 22, wall lens 21, and a plurality of focusing lenses 24, 26, and 28. In a flat lens array, such as shown in FIG. 2A, the highly reflective material $27a$ xxx n, in its simplest form, will direct or guide the radiation linearly (relative to the overall perpendicular) that is directly downward. In that the sun is not directly overhead - in the Northern Hemisphere - in the winter months, the capping lens 22 of FIG. 2 is not a flat surface array as shown in FIG. 2A but is angled or contoured as typically shown in FIG. 2E. The degree of the angle or curvature may be controlled by the variable factors and taking into consideration primarily the surface area of the focusing lens 24. That is, the light radiation transmitted from the light guides of the capping lens 22 strikes the focusing lens 24 uniformly over its entire surface. Accordingly, the direction of the radiation transmitted will remain constant although the angle of the incident solar radiation will vary as the sun will be moving from horizon to horizon.

With reference to FIGS. 2B and 2C, the surfaces of the reflective material $29a$ xxx n of the wall light guide lenses are not linearly relative to each other but are slanted in one direction for the one wall and in the other direction for the other wall. In actuality the slanted reflective surfaces provide the necessary directivity for the incident solar radiation. In other words the light guides comprising the capping lens 22 are generally in the vertical and displaced from the vertical relative to the angles of the sun.

To increase the amount of incident solar radiation striking the focusing lens 24, additional focusing lenses 26 and 28 are utilized in a stacked and spaced relationship to focusing lens 24. The focusing lens 26 will receive the transmitted radiation from lens 24 and similarly lens 28 will receive the transmitted radiation from lens 26. Surrounding the lenses 24, 26, and 28 and the spacing therebetween is the light guide wall lens array 21. This lens 21, too, like the capping lens 22, is made up of high and low refractive (transparent and reflective) material. Accordingly, in addition to the solar radiation striking the capping lens 22, solar radiation also strikes the reflective surfaces 29a xxx n of the wall light guide lenses 21 to direct the solar radiation to the surface of the focusing lenses 26 and 28.

As indicated above the angle of the solar radiation transmitted (passing to focusing lens 24) is dependent on the angle of the incident solar radiation, the wavelength of the solar radiation and the width and length of the guide (reflective surface). The light guides comprising the capping lens 22 are generally in the vertical and displaced from the vertical relative to the angle of the sun. Whereas, the light guides comprising the wall lens 21 are generally in the horizontal and displaced from the horizontal relative to the angles of the sun.

In that the primary directivity of the capping light guide lens 22 (in the vertical) is displaced 90° from the primary directivity of the wall light guide lens 21 (in the horizontal), it can be appreciated that the solar radiation transmitted must be "bent" by the wall light guide lens 21 to strike the flat surface of the focusing lenses 26 and 28. Accordingly, relative to the horizontally displaced angle of the light guides of the wall lens 21, the one side of the cylinder will have the guides in a given direction such as that of FIG. 2C and the other side of the cylinder will have the guides in the opposite direction such as that of FIG. 2D.

The structure of the overall system of FIG. 1 and particularly the collector lens 20 of FIG. 2 comprising top lens 22 and wall lens 21 can take most any overall configuration - round, square, cylindrical, and so on. In the preferred embodiment of FIGS. 1 and 2, the wall lens 21 is cylindrical and the top lens 22 is circular with an angle peaking at the center, i.e., conical. The top lens 22, too, may take other shapes such as curved as shown in FIG. 2O or with non-parallel surfaces such as shown in FIG. 2E.

Referring again to the overall preferred embodiment of FIG. 1 and particularly to the lens schematic of FIG. 2, the focusing lenses 24, 26, and 28 may now be described. The focusing lenses, similar to the capping lens 22 and wall lens 21, are a series of side-by-side light guides as shown in FIG. 2F. As aforesaid, the light transmitted by the light guides of the lens array is evenly distributed over a flat surface irrespective of the angle of the sun. This is shown relative to the several embodiments previously described. In the embodiment of FIG. 2G the light guides are serially and periodically part of a flat surface array. However, the reflecting surfaces 23a xxx 23n of the one side 21 are angled in a direction opposite to the reflecting surfaces 24a xxx 24n of the other side 25.

In operation, and again as above described, the solar radiation from a linear direction strikes the surfaces 21 and 25 uniformly throughout. However, due to the angle imparted to the reflecting surfaces 23a xxx 23n of the one side 21 and 24a xxx 24n of the other side 25 the light is "bent" or directed inwardly to a central or focul region. In the actual preferred embodiment the focusing lens shown in the schematic of FIG. 2G is a cross section of a circular configuration which has a continuous row of reflecting surfaces all directing the solar radiation inwardly.

The additional focusing lenses 26 and 28 in the preferred embodiment shown in FIG. 1 are similarly constructed.

In certain applications for certain given periods of excess "sun" days, the accumulated heat within the overall collector lens 20 may exceed a safe standard. To limit the amount of incoming solar radiation a shutter automatically responsive to temperature is movably positioned over the dome 61 of the lens 22. This controls and limits the amount of solar radiation entering the lens arrangement 20.

Referring again to the complete embodiment of FIG. 1, the solar radiation focused by the focusing lens 24 is directed through the insulation area 30. The insulation area 30 is in sealed engagement with the insulator 33 - comprising a pair of plates with an insulating material therebetween, the thermal storage 40, and the insulated side walls 32. The purpose, and function of insulation cavity 30 is to act as a heat convection barrier to the thermal storage area - when the solar radiation has diminished. That is, to "seal off" the thermal storage area 40 from any heat loss but yet not inhibit the passage of the solar radiation received from the collector lens arrangement 20 and equally heat when auxiliary source 42 is being utilized.

Particularly, the insulating area 30, in the preferred embodiment, is a liquid container. The container comprises outside wall 32, bottom panel 33 positioned in a sealed engagement with shoulder 22a, and at its top the focusing lens 24. The liquid comprises a solution 31 of water and salt - in the preferred embodiment a 15% NaCl solution.

In operation of the insulation cavity 30, as the solar radiant energy is converted to thermal energy (heat), the thermal radiation passes up through the bottom panel 33 and to the liquid solution 31. As the heat increases the soluability of the salt increases causing the solution 31 to form into heat resistant layers - horizontal stratification. The greater the heat the greater the increase in soluability and hence the greater the number of layers. This phenomena has been proven to occur. With the salt layers of the preferred embodiment the heat loss from the thermal storage and in the presence of temperature gradiant above and below in closed container, the liquid solution becomes an internal nearly isothermal layer.

With the salt layers of the preferred embodiment the heat loss from the thermal storage section 40 has been reduced to the order of one percent (1%).

In that the normal "tap" water - or even so-called well water - is not pure $H_2O$ and in fact does contain much foreign material and contaminants, it is necessary that the liquid insulation tank 30 be periodically flushed out. To accomplish the flushing operation there is provided a fresh water source with pump 36 tapped into inlet 33, and a drain outlet 34. Additionally, a continuous flow utilizing the inlet 32 and outlet 34 for salt gradient maintenance is included in the preferred embodiment.

As indicated above the solar radiation passes through the insulation area 30 and into the storage section 40 where the solar radiation is converted into heat. Storage section 40 is in essence also a closed sealed container made up of side wall 42, bottom plate 45, and top plate 45. The container 40 is filled with a liquid or solid material of a nature that "absorbs" the radiant energy. Such a material may be known to the art having a high rate of absorption to solar radiation. With a given material having a high rate of absorption to the particular solar radiation the lens is designed to select and pass that particular wavelength.

Positioned in the lower region of the thermal storage section 40 is the heat collector and extraction assembly 47. The collector assembly 47 per se is conventional and may take other known forms. Connected to both sides of the collector plates 47 is the conductive thermal transfer assembly in this instance a heat pipe 48. In turn the heat pipe 48 is connected to heat utilization means 50 also conventional and commercially operable.

The solar heater of the present invention is intended as the primary heat source and may be utilized for the home or commercially. The size of the unit - although relative to other solar units is most small - would be increased depending on the increased area to be heated. However, with the extremely efficient collector lens 20 in reality it is only the storage area that need be increased. Alternatively, and more expediently, several storage areas distributed throughout a given area may be connected in tandum to provide a uniform heat distribution.

It is appreciated, of course, that there may be periods of time when the sun doesn't "shine" and this may be especially devastating in the winter months when the days are the shortest. Realistically then the solar heater system of the present invention - although having a much greater and effective storage system - cannot be operable indefinitely. During those "dark" periods of time when the temperature of the storage system drops below a predetermined standard, an auxiliary heat source 41 is thermostatically activated. This heat source can be conventional such as electrical, or may take some other form of energy.

The overall construction of the solar heater of the present invention may take most any geometrical configuration - square, rectangular, oval, contoured, etc. The preferred embodiment was chosen to be cylindrical with a semi-flat top lens. The advantage of this configuration is that the system and particularly the lens need not be mechanically reoriented to "follow the sun". The lens is equally operative with the sun at any angle from horizon to horizon and an any angle in the north/south excursion.

The construction of the enclosure 10 comprises a cover of clear glass or plastic dome 61 operable primarily as a protective cover. This cover 61 is fixedly positioned and sealed to outside casing 62. The enclosure 62 comprises as a primary support a metal jacket 63 and an outer wall of insulating material 64 with an outdoor finish. The walls 32 and 42 above-noted relative to the insulation area 30 and storage section 40 are an inner wall liner of high temperature material. Insulating material fills the void 65 between the metallic casing 63 and the inner liner 32 and 42. The outside and inner liners, and the metallic casing are joined in a supporting relationship as shown at junction 66. However, prior to outside wall 64 joining with the supporting metallic casing 63, the inner liner 32, and the insulating material 65, the outer wall is formed into a supporting collar 67. This permits the entire unit to be supported structurally adjacent to the enclosure to be heated.

Although only a specific and preferred embodiment has been shown and described, it is understood that modifications may be had thereto without departing from the true spirit and scope of the invention.

What is claimed is:
1. A solar heater comprising in combination:
an enclosure,
a collector lens positioned in the uppermost region of said enclosure, said collector lens comprising an array of light guide lenses of alternate high refractive material and low refractive material and a focusing lens;
a storage section positioned in the lowermost region of said enclosure comprised of material having a high rate of absorption to solar radiant energy to thereby convert said solar radiant energy to thermal radiant energy;
an insulating area positioned within said enclosure intermediate of said lens and said storage area, said insulating area further comprising a container with a liquid solution therein that is transparent to solar radiation and an isothermal convection barrier; and
said enclosure further comprising a liquid and air seal to said lens, insulating area, and storage section; and
utilization means for utilizing said thermal energy in said storage section.

2. The solar heater of claim 1 wherein said collector lens further comprises a plurality of spaced focusing lenses in a stacked relationship.

3. The solar heater of claim 2 where said focusing lenses each comprise a series of said light guides periodically displaced from each other in an array and wherein said light guides are directive to focus said solar energy to a central region.

4. The solar heater of claim 1 wherein said collector lens further comprises an upper lens of a series of alternately and periodically displaced light guides in said array and a wall lens adjacent the perimeter of said plurality of spaced focusing lenses of a series of said light guides alternately and periodically displaced in said array, and wherein said light guides are operative to uniformly distribute said solar energy upon the surface of said focusing lens.

5. The solar heater of claim 3 wherein the primary directivity of each of said light guides for said upper lens is in the vertical and wherein the angle of said light guides is displaced from the vertical whereas the primary directivity of each of the light guides of said wall lens is in the horizontal and wherein the angle of said light guides is displaced from the horizontal.

6. The solar heater of claim 3 wherein said collector lens is of a circular configuration and said wall lens is of a cylindrical configuration and means for intimately joining said lenses.

7. The solar heater of claim 1 wherein said liquid solution of said insulating area comprises a water and salt solution that in the presence of a temperature gradient becomes an isothermal convective layer by horizontal stratification.

8. The solar heater of claim 1 wherein said insulating area container further includes a water inlet and water outlet for providing salt gradient maintenance.

9. The solar heater of claim 1 wherein said material in said storage area has a high rate of absorption to the incident solar radiation.

10. The solar heater of claim 1 wherein said storage section further includes an auxiliary heat source thermostatically actuated to heat said storage area when the heat dissipation exceeds a predetermined level.

* * * * *